United States Patent
Beier et al.

(10) Patent No.: US 6,236,337 B1
(45) Date of Patent: May 22, 2001

(54) PROCESS FOR TRANSMITTING INFORMATION BETWEEN MOVING BODIES AND A COMMUNICATION DEVICE FOR CARRYING OUT THIS PROCESS

(75) Inventors: Wolfgang Beier, Weil der Stadt; Horst Idler, Stuttgart, both of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/027,694

(22) Filed: Feb. 23, 1998

(30) Foreign Application Priority Data

Feb. 25, 1997 (DE) ................................................ 197 07 537

(51) Int. Cl.⁷ ........................................................ G08G 1/09
(52) U.S. Cl. ........................ 340/905; 340/426; 340/988; 342/457; 455/11.1
(58) Field of Search ...................... 340/905, 988, 340/426; 455/11.1, 7; 342/457, 357

(56) References Cited

U.S. PATENT DOCUMENTS

| | | | |
|---|---|---|---|
| 2,748,266 | * | 5/1956 | Boyd . |
| 4,639,937 | * | 1/1987 | McRae et al. .......................... 375/40 |
| 4,706,086 | * | 11/1987 | Panizza ................................ 340/902 |
| 5,032,845 | * | 7/1991 | Velasco ................................ 342/457 |
| 5,355,511 | * | 10/1994 | Hatano et al. ....................... 455/11.1 |
| 5,631,642 | * | 5/1997 | Brockelsby et al. ................. 340/426 |
| 5,890,054 | * | 3/1999 | Logsdon et al. ..................... 455/11.1 |

FOREIGN PATENT DOCUMENTS

| | | |
|---|---|---|
| 2910016 | 9/1979 | (DE) . |
| 3337646 | 2/1987 | (DE) . |
| 3337648 | 2/1987 | (DE) . |
| 4034681 | 5/1992 | (DE) . |
| 4035398 | 5/1992 | (DE) . |
| 9308251 | 10/1993 | (DE) . |
| 4425530 | 2/1995 | (DE) . |
| 195 24 949 | 2/1996 | (DE) . |
| 4403990 | 9/1996 | (DE) . |
| 195 35 021 | 7/1997 | (DE) . |
| 196 08 846 | 11/1997 | (DE) . |
| 197 26 956 | 1/1998 | (DE) . |
| 0245555 | 11/1987 | (EP) . |
| 2736789 | 1/1997 | (FR) . |
| 2250619 | 6/1992 | (GB) . |
| 9609615 | 3/1996 | (WO) . |
| 9622636 | 7/1996 | (WO) . |

OTHER PUBLICATIONS

Mehr Sicherheit mit Funk–Technik. IN: Funkschau, 20/1995, pp. 72–74.
Sicherheit durch Funkverbindungen. In: Funkschau, 21/996, pp. 66–67.
Fahrzeugortung und Kommunikation im Verbund. In: net 46, 1992, H.6, S.289.
JP 6–36185, In: Patents Abstracts of Japan, P–1739, May 18, 1994, vol. 18, No. 261.

* cited by examiner

Primary Examiner—Brent A. Swarthout
(74) Attorney, Agent, or Firm—Ware, Fressola, Van Der Sluys & Adolphson LLP

(57) ABSTRACT

A process for transmitting information between moving bodies, in particular vehicles (3, 4, 5, 8, 8'), wherein each of the moving bodies has a communication device (6) for receiving and sending radio messages (7). In order to be able to transmit information very rapidly to a large number of moving bodies,

- a radio message (7) is generated, which contains the information and limit parameters, which signalize an end of the information transmission,
- at least one of the moving bodies receives the radio message (7) and sends it to every other moving body that comes within range of the radio message (7), and
- for the cascade-like dissemination of the information, every other moving body that has received the radio message (7), sends it to every other moving body that comes within range of the radio message (7).

6 Claims, 2 Drawing Sheets

PROCESS FOR TRANSMITTING INFORMATION BETWEEN MOVING BODIES AND A COMMUNICATION DEVICE FOR CARRYING OUT THIS PROCESS

TECHNICAL FIELD

The invention relates generally to a process for transmitting information between moving bodies, e.g. vehicles, using a radio transceiver and, more particularly, to a communication device which also evaluates the information received and presents it to the vehicle operator in audio and/or visual form.

BACKGROUND OF THE INVENTION

Communications systems have been disclosed in which information is sent to a particular receiver by means of a correspondingly modulated radio message originating from a stationary or mobile sender. For many uses, this bilateral communication is completely sufficient. However, there is an increasing demand for multilateral information exchange between moving bodies. Moving bodies are understood here to mean, in the broadest sense, any bodies which can change location in relation to one another, for example even driverless transport systems which are equipped with a separate intelligence and coordinate their movements with one another. In the following, though, the considerations primarily relate to vehicles of street, rail, and air traffic.

SUMMARY OF THE INVENTION

An object of the invention is to provide a process and a communication device, by means of which information can be very rapidly transmitted to a large number of moving bodies, in particular vehicles.

According to the invention, this object is achieved by transmitting a radio message which contains information and also parameters which define limits to retransmission, receiving the message in a moving body and retransmitting it to every other similarly-equipped moving body within range, and successively retransmitting to further moving bodies in cascade fashion, until the limit parameters have been reached. The transmission of information is based on the cascade-like dissemination of a radio message, wherein the communication device of each vehicle in a sense functions as a relay station. The original radio message designated for transmission can be generated by a stationary transmitter as well as by a vehicle. The radio message contains limit parameters to end the information transmission. One such limit parameter can be a predetermined dissemination time, a location-based dissemination area in which the relevant information is of interest, or also a response to a query.

For example, the whereabouts of a vehicle, in particular one being sought by the police, can be of interest. To that end, each communication device contains a vehicle-specific identification, which in the event of the receipt of a radio message or query, is automatically added to the radio message and transmitted further. The identification of the vehicle from which the radio message was received can also be overwritten by this new identification.

According to an advantageous modification, when there is a result of the query, a new radio message that contains this result is generated and disseminated. After a period of time, the search result is consequently sent back to the requesting or querying point, for example a police station, in the same manner as the query. However, it is also possible to retrieve the search result at another point in the communication cascade.

The dissemination speed of a radio message, or the time that elapses between the dissemination of a query and the existence of a response, depends in a completely crucial manner on the equipment density of vehicles with the communication device for receiving and sending radio messages. At an equipment density of approximately 0.1% and a range of the radio message of approximately 100 meters, a piece of information is disseminated to all of Germany within approximately 10 hours. If the equipment density is 10%, the dissemination time for Germany falls to a few seconds.

Even if when turned off, a sought-after vehicle identifies itself as the vehicle sought, in the query, to another vehicle that is disseminating the search message. Then a new, (secret) message as to where the sought-after vehicle was found, travels in the same manner back to the sender of the search message, in particular the police, who can trace the vehicle in a well-directed manner. Preferably, a send/receive antenna is cast into the windshield and is embodied as a retroreflector. The retroreflector responds even when the remaining subassemblies of the communication system are not operational or have been shut down by manipulation.

Interests of data protection can be taken into consideration by virtue of the fact that a sought after vehicle only identifies itself if the requesting point, in particular the police, has a code which can be communicated only by the vehicle owner, wherein this code is a component of the vehicle identification.

The process claimed is distinguished in particular by means of speed and economy. A particular infrastructure is not required, so that communication costs are not incurred.

In order to give the vehicle owner an incentive to purchase the communication device, in addition to devices for receiving and sending radio messages, the communication device should also have a device for evaluating the radio message. As a result, the vehicle is used not only as a passive relay station, in which information is received and passed along. In addition, there is the possibility of using all of the information or particular information contained in the radio message for one's own purposes.

According to a preferred embodiment of the invention, information of this kind is indicated optically or acoustically. It can, for example, be information as to the traffic density. Vehicles that can automatically detect traffic jams, by evaluating the speed profile or the emergency blinkers of other vehicles, transmit corresponding information into the surrounding area. This information, as well as the corresponding information regarding the breaking up of the traffic jam, are then disseminated in accordance with the process described above. Primarily location-based limitations are used as the limit parameters in this instance, so that the dissemination area is of a size in which a traffic report can be expected to be of interest. Moreover, vehicles can also automatically determine the road conditions, in particular, whether the road is slippery. The outside temperature and the slip detected in the driving wheels can be used as measurement values for this.

Furthermore, the detection of empty parking spaces, or spaces that have just opened up, is of practical significance. Vehicles can automatically detect when they are leaving a parking space. This fact and the location of the parking space can be disseminated via a radio message. The device for evaluating the radio message displays this information to interested drivers of other vehicles. Vehicles can furthermore automatically detect when they are involved in an accident. The location of the accident, possibly along with details that are of interest to a rescue service, can be automatically disseminated by means of a radio message. The drivers of other vehicles can use this information in order to avoid chain reaction accidents. Vehicles which are equipped with a map navigation device can automatically determine deviations between the path traveled and the streets plotted. These can be either newly constructed roads or changes due to construction sites. Occasional forays into open country can be detected because they do not recur. The information as to map changes that is obtained in this manner can be transmitted with the dissemination of radio messages by means of the device for evaluating radio messages from other vehicles and stationary dispatch centers and the like.

A further refinement of the invention relates to determination of one's own position, and the support of other vehicles in service of the same task. Vehicles that can determine their relative position, in relation to other vehicles, can determine their own absolute position if they use absolute position data from another vehicle. The absolute position determined in this manner is transmitted to other vehicles, which can determine their own absolute position from it. The precision decreases with each successive coupling. Occasionally, though, there are vehicles within range of the radio message, which can determine an absolute position directly by means of cartographic correlation and/or GPS (Global Positioning System), by means of which errors due to successive coupling are corrected. In actual use, an acceptable precision is achieved for all participating vehicles if there is a minimum density of vehicles with absolute positioning determination. In order to increase this density, sending beacons, for example stationed at the side of the road can also be used. This kind of sending beacons, which continuously transmit a position signal, can be used to particular advantage in position determinations where a height coordinate is important, for example in parking structures.

A communication device with a device for evaluating radio messages and providing the vehicle operator with data about specific other vehicles, can be used, preferably for fleet management tasks, in particular of public mass transit, by shipping entities, and vehicle rental companies. The fleet members communicate with dispatch centers and with one another, without having to pay for a cost-intensive infrastructure for the transmission of information.

Preferably, one embodiment of the communication device is based on the use of DSRC frequencies (Dedicated Short Range Communication) of 5.8 GHz and/or 64 GHz, wherein the range of the radio message is approximately 100 meters and the data rate lies in the Megabit/second range.

BRIEF DESCRIPTION OF THE DRAWINGS

The invention will be explained in detail below in conjunction with two graphic representations.

BEST MODE FOR CARRYING OUT THE INVENTION

Figure 1:
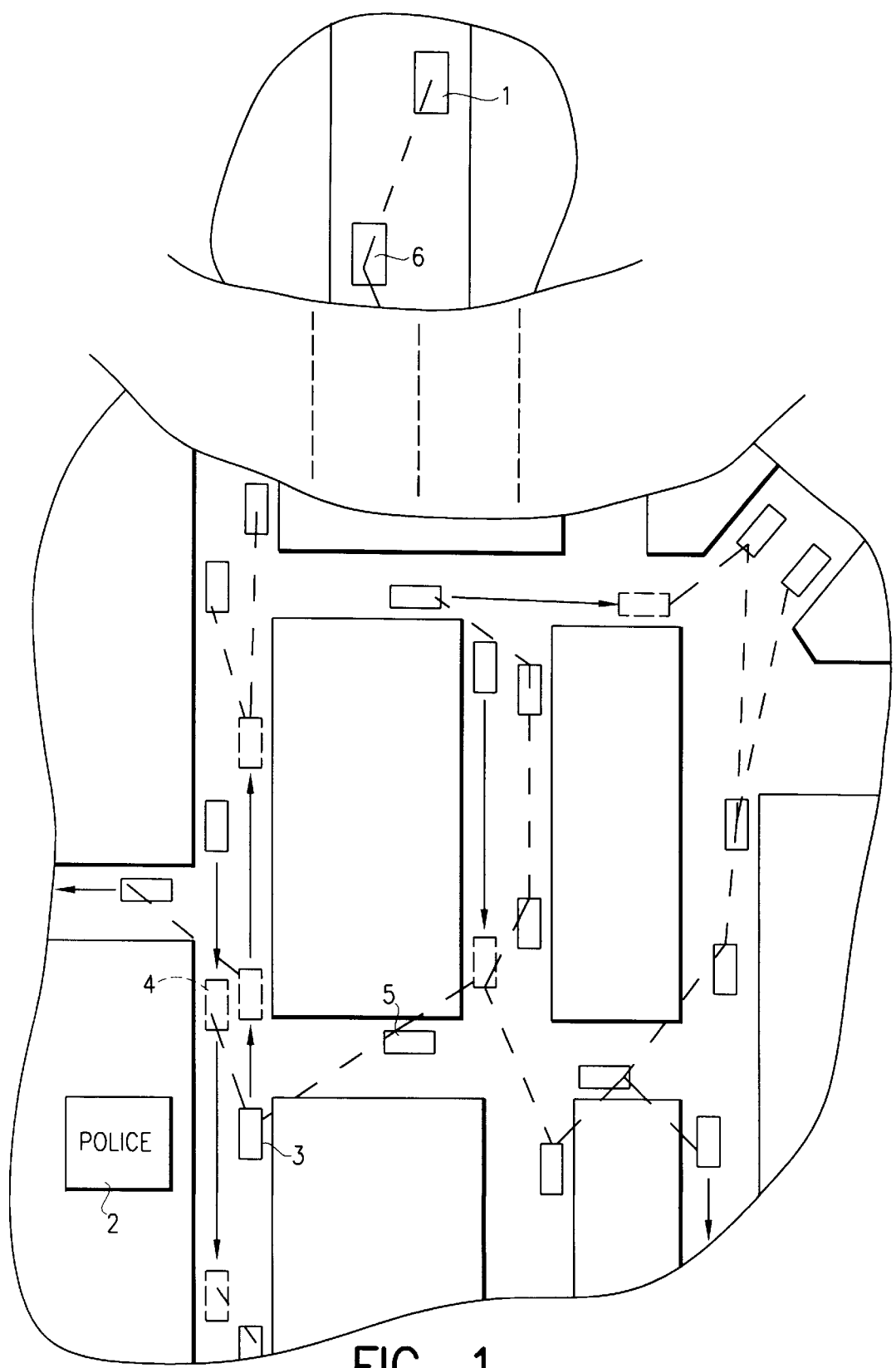
FIG. 1 is a symbolic depiction of the process.

In the example of a police search message or query, FIG. 1 shows the tracing of a vehicle 1 with a particular identification with code data of the vehicle owner. Once sent, the radio message (dash-and-dot depiction), which contains the request and limit parameters for ending the request, is sent by a police station 2 at time ($t_1$). A first vehicle 3, that happens to pass by, is the first to receive this radio message. Immediately after this, a second vehicle 4 and a third vehicle 5 come within range of the radio message, which is now being transmitted by the first vehicle 3. The three vehicles 3, 4, and 5 transmit the radio message with the search request to each vehicle that comes within range of the radio message, which for its part provides for further dissemination in the same manner. It is apparent that, even with a low range of the radio message and a low equipment density of the overall number of vehicles with a communication device required for sending and receiving, a cascade-like dissemination occurs with explosive speed. With a range of approximately 100 meters and an equipment density of approximately 10%, the information has spread over the entire territory of the Federal Republic of Germany within a few seconds. The sought-after vehicle 1 is consequently radio contacted by a vehicle 6 at a time $t_2$, wherein even when the sought-after vehicle continues the journey and there is a similar return path, a restriction to a relatively small search area is possible. Even if the return path, i.e. the sending of the response from the sought after vehicle 1 to the police station 2 is comprised by means of another distance made up of the radio transmission between different vehicles, due to very rapid intermixing and multiple contacting, an overall time, between the sending of the request or query by the police station 2 and the receipt of a response by the police station 2, amounts to only approximately $\delta t = 2(t_2 - t_1)$.

Figure 2:
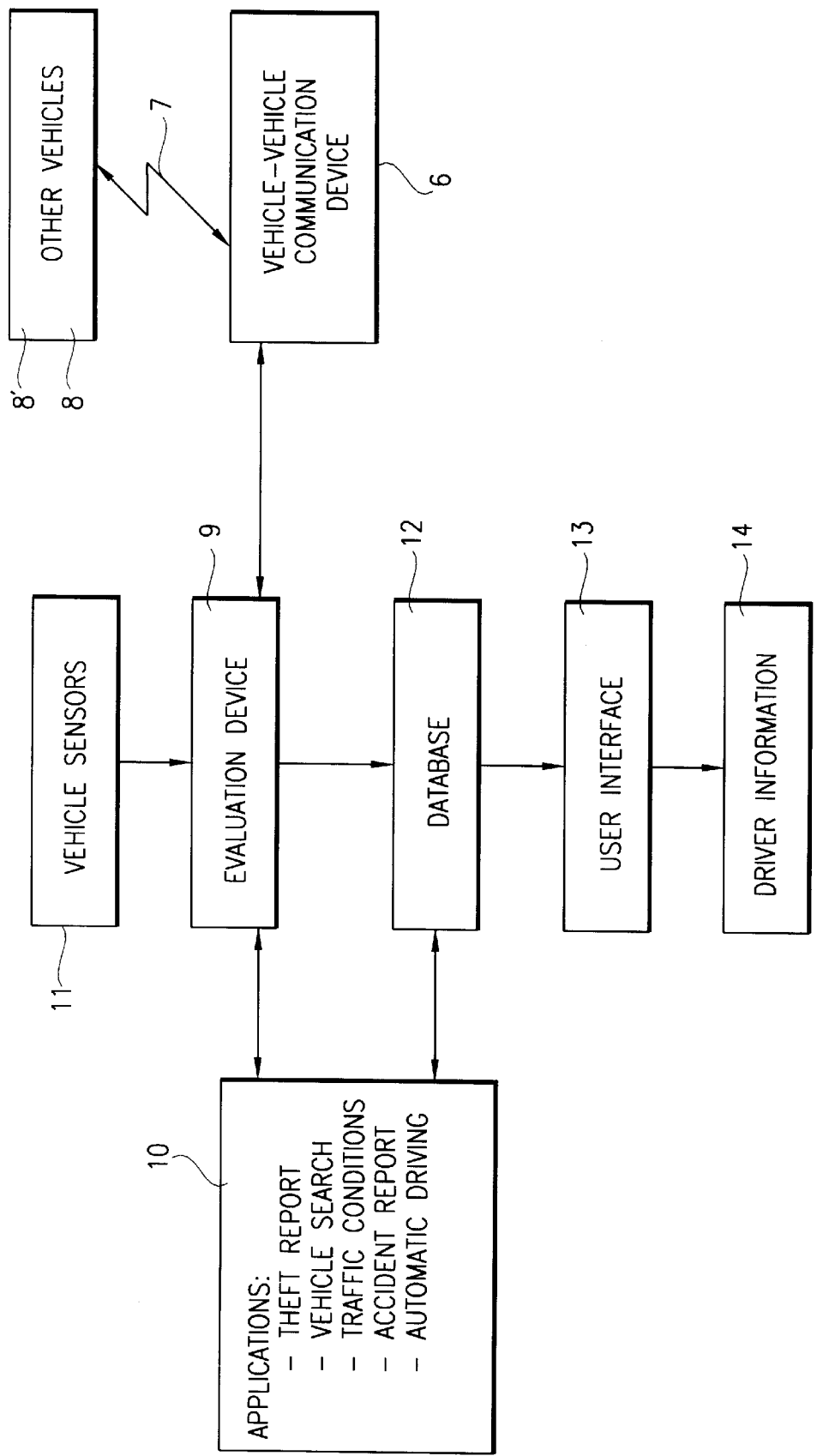
FIG. 2 is a schematic representation of the components for implementing the process.

FIG. 2 shows the cooperation of the most important components of a piece of vehicle equipment for carrying out the information dissemination process, which is described by way of example in conjunction with FIG. 1. The central subassembly is a communication device 6, which receives radio messages 7 from other vehicles 8 and sends them to still other vehicles 8'. The communication device 6 cooperates with an evaluation device 9. Depending on the application 10, this evaluation device 9 processes information that the communication device 6 has received from other vehicles 8 and data from vehicle sensors 11. Via a database 12 that cooperates with the applications 10, the output signals of the evaluation device 9 are supplied to a user interface 13. According to options set at the user interface 13, an optical and/or acoustical signalization 14 of the evaluated information is carried out. The driver of a vehicle thus equipped can select applications 10 by means of the user interface 13 and with the aid of similarly equipped vehicles 8, 8', these applications can, for example, facilitate the vehicle search in the event of theft, visually display traffic conditions, disseminate an accident report, or support automatic driving.

The invention is not limited to the exemplary embodiments given above. Rather, an embodiment of the invention is possible even with the use of fundamentally different types of subassemblies. In particular, the invention is not limited to implementation with analog components, but can also be advantageously implemented by means of integrated logic components. Various changes and modifications are possible within the scope of the inventive concept.

What is claimed is:

1. A process for multilaterally transmitting information between a plurality of moving bodies, in particular vehicles (3, 4, 5, 8, 8'), without using a fixed network or infrastructure or dedicated base stations, wherein each of the moving bodies has a communication device (6) for receiving and transmitting radio messages (7), and wherein:

a radio message (7) is generated which contains information and limit parameters which signal an end of the information transmission;

at least one of the moving bodies receives the radio message (7) and retransmits it to every other moving body that comes within range of the radio message (7) subject to the limit parameters;

for the cascade-like dissemination of the information, every other moving body that has received the radio message (7), sends it to every other moving body that comes within range of the radio message (7) subject to the limit parameters;

at least one device (6) is provided for receiving, evaluating, and transmitting radio messages (7);

the communication device (6) adds specific data to the radio message (7), in particular an identification of the moving body; and the communication device (6) comprises a device (9) for evaluating radio messages (7) which contains means for optical or acoustic indication (14) of information concerning:

traffic density, in particular concerning the onset and breakup of traffic jams, road conditions, in particular slipperiness, empty parking spaces, traffic accidents, in particular for transmission to emergency services and for the avoidance of chain reaction accidents, the street network, in particular with regard to new roads or construction sites.

2. The communication device (6) according to claim 1, characterized in that the device (9) for evaluating radio messages (7) includes means for optical or acoustic indication (14) of information concerning its own whereabouts, wherein at least one reference point is taken as the basis for said whereabouts, the reference point being the coordinates of a transmitting beacon or the whereabouts of at least one other vehicle (3, 4, 5, 8, 8'), determined by means of at least one of cartographic correlation and GPS (Global Positioning System).

3. The communication device (6) according to claim 1, characterized in that in the case of fleet members of public mass transit, shipping entities, and vehicle rental companies, the device (9) for evaluating radio messages (7) includes means for the optical or acoustic indication (14) of information as to whereabouts, status, route planning, or other user-defined criteria of other fleet members.

4. The communication device (6) according to claim 1, characterized in that the radio messages (7) are designed for the DSRC frequencies (dedicated short range communication) 5.8 GHz or 64 GHz, wherein the range of the radio message (7) is approx. 100 m and the data rate lies in the Mbit/second range.

5. The communication device (6) according to claim 2, characterized in that the radio messages (7) are designed for the DSRC frequencies (dedicated short range communication) 5.8 GHz or 64 GHz, wherein the range of the radio message (7) is approx. 100 m and the data rate lies in the Mbit/second range.

6. The communication device (6) according to claim 3, characterized in that the radio messages (7) are designed for the DRSC frequencies (dedicated short range communication) 5.8 GHz or 64 GHz, wherein the range of the radio message (7) is approx. 100 m and the data lies in the Mbit/second range.

* * * * *

UNITED STATES PATENT AND TRADEMARK OFFICE
CERTIFICATE OF CORRECTION

PATENT NO. : 6,236,337 B1
DATED : May 22, 2001
INVENTOR(S) : Beier et al.

It is certified that error appears in the above-identified patent and that said Letters Patent is hereby corrected as shown below:

Column 6,
Line 28 (line 3 of claim No. 6), please delete "DRSC" and substitute therefor -- DSRC --.
Line 30 (line 6 of claim No. 6), after the word "data" please insert the word -- rate --.

Signed and Sealed this

Thirteenth Day of November, 2001

Attest:

NICHOLAS P. GODICI
*Attesting Officer*  *Acting Director of the United States Patent and Trademark Office*